(12) United States Patent
Hou et al.

(10) Patent No.: US 8,437,569 B2
(45) Date of Patent: May 7, 2013

(54) AUTOMATED UNDERWATER IMAGE RESTORATION VIA DENOISED DECONVOLUTION

(75) Inventors: Weilin Hou, Slidell, LA (US); Alan Weidemann, Carriere, MS (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/470,981

(22) Filed: May 14, 2012

(65) Prior Publication Data

US 2012/0263358 A1 Oct. 18, 2012

Related U.S. Application Data

(62) Division of application No. 12/418,683, filed on Apr. 6, 2009, now Pat. No. 8,204, 328.

(60) Provisional application No. 61/043,302, filed on Apr. 8, 2008.

(51) Int. Cl.
*G06K 9/40* (2006.01)

(52) U.S. Cl.
USPC ........... 382/254; 382/305; 382/260; 382/299; 382/255; 382/262; 382/263; 382/270; 382/274; 382/275

(58) Field of Classification Search .................. 382/254, 382/305, 260, 299, 255, 262, 263, 270, 274, 382/275
See application file for complete search history.

(56) References Cited

U.S. PATENT DOCUMENTS

| 5,319,719 A | 6/1994 | Nakazawa et al. |
| 6,795,585 B1 | 9/2004 | Parada et al. |
| 8,204,328 B2 | 6/2012 | Hou |
| 2005/0052541 A1* | 3/2005 | Kondo ........................ 348/222.1 |

OTHER PUBLICATIONS

W. Hou, et al, Why does the Secchi disk disappear? An imaging perspective, Optics Express vol. 15, No. 6, 2791-2802 (2007).
Z. Wang, et al, Why is Image Quality Assessment so difficult? Proc IEEE Int. Conf. Acoust, Speech and Signal Processing (2002).
W. Winkler, Quality Metric Design: A Closer Look, Proceedings, of SPIE, (2000).
P. Marziliano, et al, Perceptual blur and ringing metrics: application to JPEG2000, Signal Processing: Image Communications 19, 163-172 (2004).

(Continued)

*Primary Examiner* — Mike Rahmjoo
(74) *Attorney, Agent, or Firm* — Amy L. Ressing; Joslyn Barritt; Kathleen Chapman

(57) ABSTRACT

A method for simultaneously optimizing a digital image taken in or through a scattering medium and obtaining information regarding optical properties of the scattering medium is provided. Digital image data are received by a computer. The digital image is evaluated according to an objective image quality metric and a resulting image quality value is compared to a previously stored image quality value for the image. A revised optical transfer function is derived by modeling the optical properties of the medium to be used to generate a restored digital image, which is derived from the original image and the revised optical transfer function. The restored digital image is evaluated according to the objective image quality metric and an optimized restored image is identified. The optical properties associated with the optical transfer function producing the optimized restored image represent a close approximation of the true optical properties of the medium.

17 Claims, 5 Drawing Sheets

OTHER PUBLICATIONS

X. Marichal, et al, Blur Determination in the Compressed Domain Using DCT Information, IEEE International Conference on Image Processing, pp. 386-390 (1999).

N. Nill, et al, Objective image quality measure derived from digital image power spectra, Opt., Eng, vol. 31(4), pp. 813-825 (1992).

R. Ferzli, et al, No-reference objective wavelet based noise immune image sharpness metric, IEEE International Conference on Image Processing, pp. 405-408 (2005).

M. Belge, et al, Wavelet domain image restoration with adaptive edge-preserving regularization, IEEE Transactions on Image Processing, vol. 9, No. 4, pp. 597-608 (2000).

D. Sadot, et al Restoration of thermal images distorted by the atmosphere, based on measured and theoretical atmospheric modulation transfer function, Opt. Eng., vol. 33(1), pp. 44-53 (1994).

Y. Yitzhaky, et al Restoration of atmospherically blurred images according to weather-predicted atmospheric modulation transfer functions, Opt. Eng. vol. 36, No. 11, pp. 3062-3072 (1997).

D.L. Donoho, De-noising by soft-thresholding, IEEE Trans. of Inf. Theory, vol., 41, No. 3, pp. 613-627, (1995).

W. Hou, et al, Comparison and validation of point spread models for imaging in natural waters, Opt. Exp. 16, No. 13, pp. 9958-9965 (2008).

W. Hou et al., U.S. Appl. No. 13/470,804, Automated Underwater Image Restoration Via Denoised Deconvolution, filed May 14, 2012, Divisional of U.S. Patent # 8204328.

Notice of Allowance, U.S. Appl. No. 12/418,683, filed Apr. 6, 2009, NOA mailed on Feb. 16, 2012.

* cited by examiner

FIG. 5B
FIG. 5D
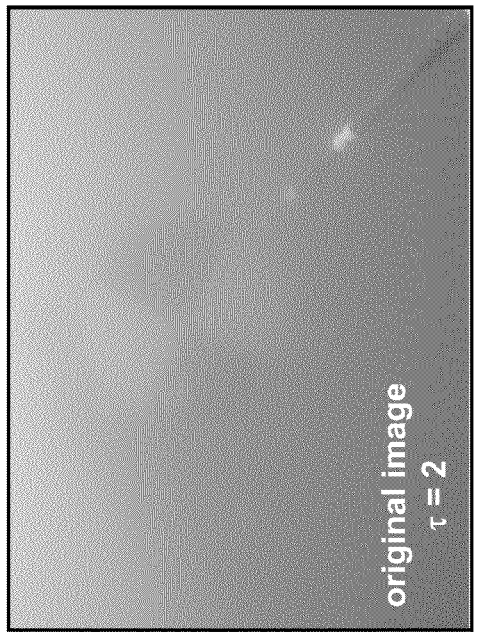
FIG. 5A
FIG. 5C

AUTOMATED UNDERWATER IMAGE RESTORATION VIA DENOISED DECONVOLUTION

CROSS-REFERENCE

This application is a divisional of U.S. patent application Ser. No. 12/418,683, filed on Apr. 6, 2009, entitled Automated Underwater Image Restoration Via Denoised Deconvolution, which application claims the benefit of priority based on U.S. Provisional Patent Application No. 61/043,302 filed on Apr. 8, 2008, the entirety of both documents are hereby incorporated by reference into the present application.

TECHNICAL FIELD

The present invention relates to image processing and image restoration, particularly relating to images of objects in and through a scattering medium such as images of objects under water.

BACKGROUND

The quality of images taken under water is vital to many military and civilian applications involving mine detection, diver visibility, and search and rescue. The ability to obtain better images at greater distances has often been a central goal of underwater imaging projects. Unlike in the atmosphere, where visibility can be on the order of miles, the visual range in the underwater environment is rather limited, at best on the order of tens of meters, even in the clearest waters. This is the result of the combined attenuation effects from both absorption, i.e., photons being absorbed into water molecules, phytoplankton cells, and detritus, and scattering, i.e., photons being bounced away from the original path into different traveling directions. It is mostly the effects of scattering by water and particulates that make the water look dirty or less transparent, resulting in a blurred image seen by human eyes and recorded by cameras.

Image quality representation is an interesting and important research subject in digital image processing, especially with the rapid expansion of digital cameras, scanners, and printers into the everyday life of most households in recent years. Such devices would be of little use if they did not provide an acceptable representation of the subject of the image that was suitable for its intended purposes. The ability to objectively differentiate qualities amongst different images is critical in digital image processing, both for post-processing restoration of degraded imageries and in real-time imaging enhancement.

A widely used criterion to evaluate image quality is the sharpness of the image, which represents the ability to reproduce details of subjects in the image. This directly affects the image's resolution, which is often expressed in terms of smallest pixels or the inverse of the highest spatial or angular frequency of the imaging system. Another related quality measure is the contrast of an image, and is usually determined by the difference between lighter and darker areas, normalized by the averaged brightness of both areas. See W. Hou et al., "Why does the Secchi disk disappear? An imaging perspective," Opt. Exp. 15, 2791-2802 (2007) and H. H. Barrett et al., Foundations of image science (Wiley-Interscience, Hoboken, N.J., 2004).

The most significant contributor to image blur is scattering, especially multiple scattering, where the path of a photon changes several times before reaching the receiver. The reduction in image quality due to scattering is two fold. Firstly, the un-scattered direct beam which contributes to the sharp part of the image is correspondingly reduced. Secondly, the scattered photons help to brighten the previously darkened area thus reduce contrast. Adding absorption on top of scattering, the reduction in signal can be so great that the electronic noise of the system becomes a factor, further complicating the issue.

The amount of blurring in an image can be described by how much blur a point-source will introduce over the imaging range. This property is the point-spread function (PSF) of the imaging system. The Fourier transform of the PSF is known as the optical transfer function (OTF), generally for incoherent imaging without considerations of phase information, the magnitude of OTF, referred to as the modulation transfer function (MTF), often is used. The OTF (or MTF) describes the frequency response of signals over transmission range, or how fast the details of an image degrade in a given environment. To compensate for blur and improve imagery effectively, it is critical to incorporate knowledge of the optical properties of the water to better model the degradation process.

Studies have been done regarding image degradation through the atmosphere transmission. However, unlike the underwater environments, degradations of the image quality by the atmosphere are most dominantly caused by turbulence under optimal conditions, although scattering by particles and aerosols also play a minor role. Better restoration in astronomy or reconnaissance applications can be obtained with knowledge of the modulation transfer functions. See D. Sadot et al., "Restoration of thermal images distorted by the atmosphere, based on measured and theoretical atmospheric modulation transfer function," Opt. Eng. 33, 44-53 (1994); and Y. Yitzhaky et al., "Restoration of atmospherically blurred images according to weather-predicted atmospheric modulation transfer functions," Opt. Eng. 36, 3062-3072 (1997).

The scattering behavior is different in the situation of natural waters, where strong forward scattering dominates. For example, in coastal waters, especially those inside a harbor, or in estuary areas such as Mississippi, visibility can quickly reduce to zero in a matter of a few feet. The same applies to regions of strong re-suspensions from the bottom, both in coastal regions as well as in the deep ocean. The images obtained under such conditions are often severely degraded or blurred. The extent of such blurring can be described by the PSF (MTF in frequency domain) of the medium which includes water itself, constituents within such as particulates (both organic and inorganic). See W. Hou et al, Opt. Exp. 15, supra. Theoretically, such effects can be compensated by deconvolving the PSF of the medium from the resulting images. See H. H. Barrett et al., supra.

Although traditional image enhancement techniques can be applied to imagery obtained from underwater environments, their effectiveness is considerably limited because they do not take into account the processes that lead to the degraded images, which involve in-depth understanding of the optical properties of the medium.

In theory, complete and accurate restoration can be achieved to high fidelity with known system functions and noise characteristics. In reality, the effectiveness is often hindered by errors associated with the modeling efforts deriving the MTF and the approximations applied. The noises from measurement results are also part of the mix. Additionally, due to the small incremental quality improvements in restoring degraded images, it is hard to judge if one restored result is better than the other, which is critical in an automated process. For these reasons, it is necessary to develop a method to determine objectively the quality of resulting image that associates correctly with the environmental properties. This, in turn, can be used to better determine the more specific issues affecting imaging in underwater environment, namely, low lighting thus low signal to noise levels, fluctuations caused by the medium, and multiple scattering contributions.

Recent advance of wavelet research provides an excellent tool for this purpose, as wavelets are multi-resolution in nature. See G. Kaiser, *A Friendly Guide to Wavelets*, (Birkhauser, 1994).

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides a method and system for automated underwater image optimization and restoration that allows retrieval of better underwater images and simultaneously provides information regarding optical properties of the environment.

In accordance with the present invention, an objective image quality metric (IQM) for underwater imaging is provided. This metric is based on a weighted grayscale angle (WGSA), a sharpness metric constrained by a normalized high-frequency wavelet power spectrum. The image restoration method of the present invention evaluates the image according to the IQM and calculates a WGSA value for the image, which provides a measure of image quality.

The IQM and WGSA are applied to the image in a computer-implemented automated optimization and restoration process according to the present invention. First, the raw unprocessed image is evaluated according to the IQM and a baseline WGSA is calculated. The computer-implemented restoration process then starts with a set of data representing estimated optical properties of the water. The estimated optical properties are used to derive a modeled MTF, which is then used to deconvolve the system influence and obtain a restored or "true" image. The quality of the restored image is then assessed by applying the IQM to the image and calculating a revised WGSA to represent the quality of the restored image. The revised WGSA is then compared to the previously calculated WGSA to determine whether the WGSA can be improved by further optimization of the image. If, based on the search/optimization algorithm used, a determination is made that the WGSA can be improved, the restoration cycle begins again, using a second set of estimated optical properties. This process continues until the WGSA can no longer be improved by further optimization, and the "best" restored image is output. In an exemplary embodiment, one of such search algorithms can be an exhaustive search through all possible combinations of the optical parameters of the medium, though any other suitable search algorithm can be used. In addition, by examining the MTF that generated that "best" image, an estimation of the environmental optical properties of the medium such as the coefficients of absorption, scattering, and attenuation can be retrieved.

BRIEF DESCRIPTION OF THE DRAWINGS

FIGS. 5A to 5D depict comparative results of image restoration using various values for the optical properties of the scattering medium.

DETAILED DESCRIPTION

Figure 1:
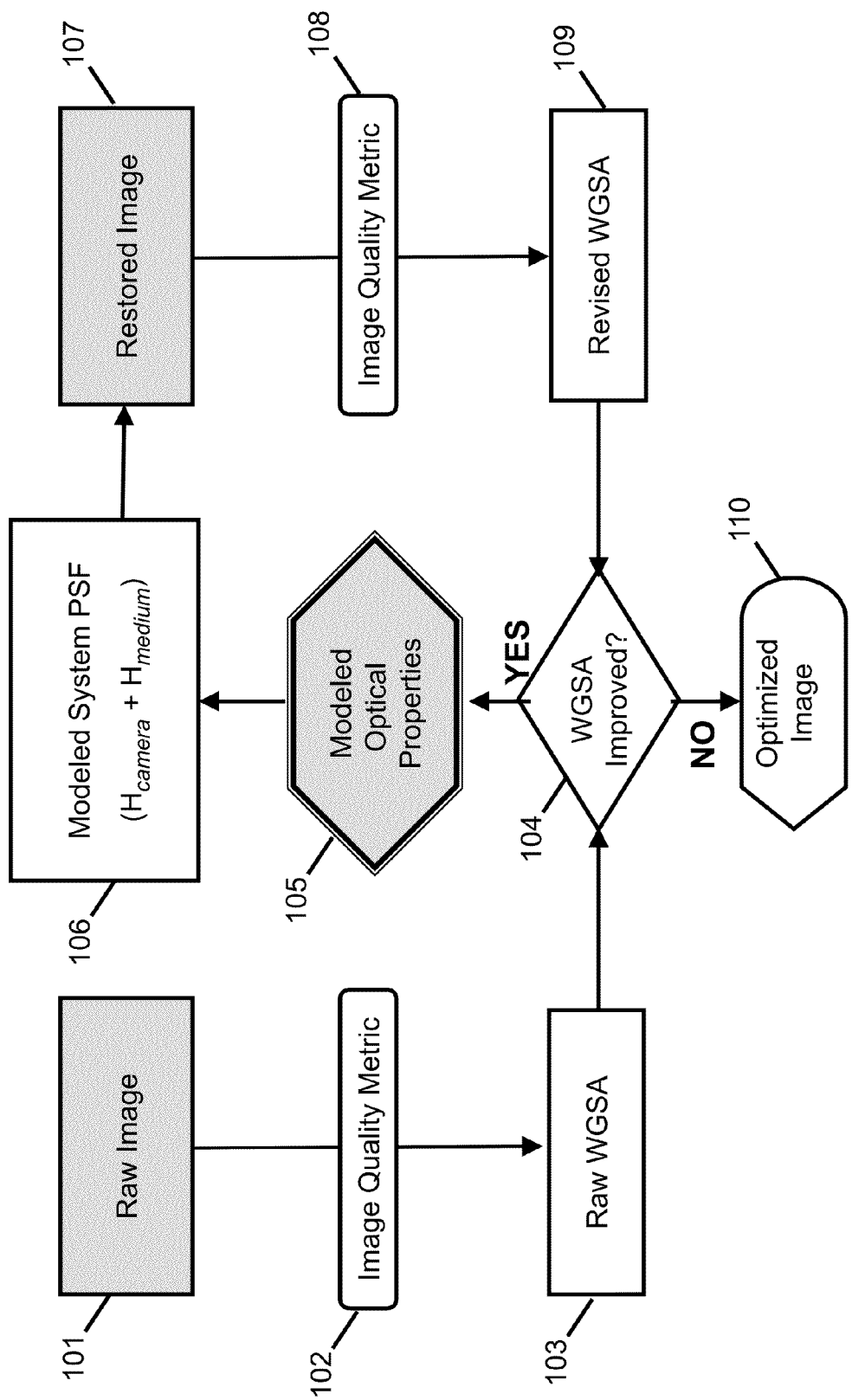
FIG. 1 is a block diagram depicting an exemplary process flow in a method for simultaneously restoring an underwater image and retrieving information regarding the optical properties of the medium in accordance with the present invention.

The invention summarized above can be embodied in various forms. The following description shows, by way of illustration, combinations and configurations in which the aspects can be practiced. It is understood that the described aspects and/or embodiments of the invention are merely examples. It is also understood that one skilled in the art may utilize other aspects and/or embodiments or make structural and functional modifications without departing from the scope of the present disclosure.

For example, although the present invention may be described in the context of underwater imaging in a seawater medium, it would be readily apparent to one skilled in the art that aspects of the invention described and claimed herein can be applied to any type of imaging in a medium where the medium may have optical properties relating to scattering and/or attenuation, such as imaging in foggy, smoggy, or smoky conditions. In addition, the present invention can also be applied in medical imaging, where the image may be affected by biological scattering media such as blood and tissues.

Also, although the present invention may at times be described in terms of the modulation transfer function (MTF) to demonstrate its effectiveness in the context of the described exemplary embodiments, one skilled in the art would appreciate that the term "optical transfer function" may also be used to refer to the general case encompassing both coherent and incoherent imaging, and that the present invention is applicable to both coherent and incoherent imaging.

As noted above, a well-defined metric of image quality can be extremely important and of tremendous value in the processing of an image. A reliable objective image quality metric is especially needed for underwater imaging in order to define the quality of an image in different environments (e.g., in waters having different optical properties) without prior knowledge of the environment in which the image is taken, independent of the content of the image, and without significant effect from noises in the image, especially those caused by low lighting conditions and high orders of multiple scattering in turbid underwater environments.

Once a dependable metric is defined, a computer can more effectively perform post-processing and real-time image enhancement to achieve an optimized image. The establishment of an objective image quality metric can be a critical component in such computerized image processing, as it allows the computer system to "know" which direction to "go" in making small incremental improvements in the image, when to stop, and how to determine if it has found the best result.

Features of the present invention include an objective image quality metric that can be used in a computer-implemented method for restoring an underwater image. The metric of the present invention is specially designed to meet the challenges in scattering medium. The present invention also provides a computer-implemented method and a system for automated image restoration that can uses this objective image quality metric to retrieve an optimized restored image and simultaneously retrieve information regarding optical properties of the underwater medium based on information of the restored image.

Generally speaking, a 2-dimensional image of an object can be considered to be the response of the imaging system to the light from the original object. Expressed mathematically, an image g(x, y) is the combination of the original signal from the object $f(x_i, y_i)$ convolved with the point spread function (PSF) h(x,y), i.e., the imaging system response of a point source from the object plane, integrated over the sensor space $\Xi$:

$$g(x, y) = \int\int_\Xi f(x_i, y_i) h(x - x_i, y - y_i) dx_i dy_i \quad (1)$$

It often can be easier to manipulate the above relationship in the frequency domain, where convolution becomes a simple multiplication. The relationship between object and image in equation (1) can be transformed from the spatial domain to the frequency domain by applying a Fourier transform to both sides:

$$G(u,v) = F(u,v) H(u,v) \quad (2)$$

where G, F, H are Fourier transforms of g, f and h respectively and u, v are spatial frequencies in the x and y directions, respectively.

H(u,v), the Fourier transform of the PSF h(x,y), is the system response function of the optical system. In linear coordinates, it takes the following form:

$$H(u, v) = \int\int_{-\infty}^{\infty} h(x, y) e^{-j2\pi(ux+vy)} dx dy \quad (5)$$

In image processing, H(u,v) often is referred to as the optical transfer function (OTF), the magnitude of which is the modulation transfer function (MTF). For simplicity herein, H(u,v) will often simply be referred to as the MTF, without regard to whether it is the function itself or the magnitude of the function that is being referenced. The MTF describes the contrast response of a system at different spatial frequencies, and when the phase information is of little concern as is the case for typical incoherent systems, it is a sufficient measure of the power transfer.

From Equation (2) above, one can see with the knowledge of the system OTF H(u,v) and the transformed image output G(u,v), the original image g(x,y) theoretically can be restored by deconvolving F(u,v) and H(u,v) in the frequency domain and performing an inverse transform to obtain the original unblurred version. Mathematically, this is simply F=G/H.

Of course, the final image that is produced by the system is the result not only of the imaging system itself but also the medium in which the image is taken. The MTF H(u,v) thus represents this total system response. Therefore if one views the complete path from the object to the final imaging plane, for example, the CCD in a digital imaging system, the MTF represents the effect of multiple individual components. Because of the cascading nature of the MTF in the frequency domain, the MTF can be expressed as the direct product of each component. For example, in a simple imaging system comprising only the camera system and the medium, the total MTF is the product of the MTF of the camera system and the MTF of the medium:

$$H_{system}(u,v) = H_{camera}(u,v) H_{medium}(u,v) \quad (6)$$

The above formulation emphasizes the validity of the separation of the system and the medium. Usually the response $H_{camera}(u,v)$ of the camera system can be pre-determined and calibrated to remove any significant errors. $H_{camera}(u,v)$ can also have additional characteristics such as the camera system's field-of-view and Nyquist sampling frequency limits imposed by the CCD resolution, which can limit the quality of the image produced. In most cases, $H_{camera}(u,v)$ does not change with imaging conditions, and consequently, differences in quality between two images taken from the same camera can be attributed to differences in $H_{medium}(u,v)$. Thus, changes to $H_{medium}(u,v)$ can result in changes in image quality.

Underwater imaging involves a circularly symmetrical response system exhibiting isotropic volume scattering of the photons reflected from an object. In such a system, the Fourier transform of the point spread function of Equation (5) can be reduced to a one-dimensional Hankel (Fourier-Bessel) integral:

$$H(\psi, r) = 2\pi \int_{\theta=0}^{\theta_{max}} J_0(2\pi\theta\psi) h(\theta, r) \theta d\theta \quad (7)$$

where ψ is the angular spatial frequency and r is the distance between the object and the imaging plane. By applying small angle approximations, an underwater modulation transfer model can be derived from Equation (7) in closed form, with adequate accuracy. See Hou et al., "Comparison and validation of point spread models for imaging in natural waters," *Opt. Exp.* 16, 9958-9965, (2008), incorporated by reference herein in its entirety.

As noted above, the total MTF can be considered as a product of the MTF of the camera system and the MTF of the medium, and this also applies to imaging in the underwater environment. With respect to the MTF shown in Equation (7), by separating out the effects of exponential decay with distance due to the medium, the MTF of the medium in Equation (7) can be expressed as $$H_{medium}(\psi, r) = e^{-D(\psi)r} \quad (8)$$

where D(ψ) is the decay transfer function (DTF). Because the present invention was originally conceived in the context of restoration of underwater images, much of the description of the methods comprising the present invention will be made in the context of this form of the MTF. However, it should be noted that although the MTF may be described herein in the context of the DTF, the MTF can be modeled in many different forms, see Hou et al, *Opt. Exp.* 16, supra, and such other modeled forms of the MTF can be used in a method within the scope of the present disclosure. In addition, the methods of the present invention can be utilized in the context of other imaging situations, and in such cases other forms of the MTF can be used when deemed appropriate.

The DTF is independent of the imaging range, i.e., the distance between the object and the imaging plane, and so provides a method to compare measurements at different ranges for consistency. As described below, the DTF, and thus $H_{medium}(\psi, r)$ relates to the scattering and absorption coefficients of the water. Consequently, information regarding the $H_{medium}(\psi,r)$ that produces an image can provide information regarding the optical properties of the medium in which the image was taken.

The DTF of seawater can be expressed as $$D(\psi) = c - \frac{b(1 - e^{-2\pi\theta_0\psi})}{2\pi\theta_0\psi} \quad (9)$$

where $\theta_0$ is related to and may be considered as a measure of the mean scattering angle (MSA) of the scattered photons.

The optical properties of the medium can be obtained from the DTF by applying a first-order Taylor expansion to $D(\psi)$:

$$\begin{aligned} D(\psi \to 0) &= c - \frac{b(1 - e^{-2\pi\theta_0\psi})}{2\pi\theta_0\psi} \quad (10)\\ &= c - \frac{b(1 - 1 + 2\pi\theta_0\psi)}{2\pi\theta_0\psi}\\ &= c - b = a\\ D(\psi \to \infty) &= c - \frac{b(1 - 0)}{\infty} = c \end{aligned}$$

where a=the absorption coefficient in $m^{-1}$, corresponding to the likelihood that a photon will be absorbed by the medium, b=the scattering coefficient, representing the likelihood that a photon will be scattered by the medium, and c=a+b=the total attenuation coefficient of the medium.

In addition, a simple point spread function of the medium can be derived from the optical properties of the medium:

$$PSF(\theta) = K \frac{br e^{-\tau}}{2\pi\theta^n} = K \frac{\omega_0 \tau e^{-\tau}}{2\pi\theta^n} \quad (11)$$

where K is a constant; $\tau=c*r$ is the optical length, where r is the imaging range and c is the total attenuation coefficient described above; $\omega_0=b/c$ is the single scattering albedo; and $n=1/\omega_0-\tau\theta_0$. This form of PSF compared well with other models and allows faster restoration calculations (See Hou et al, Opt. Exp. 16, supra.)

Thus, with the optical properties a, b, and r defined, the MTF $H_{medium}(\psi,r)$ and $PSF(\theta)$ of the underwater medium can be obtained from Equation (8) and (11). Conversely, if the MTF or PSF is known, the optical properties of the medium can be readily ascertained.

The present invention utilizes these analytic tools to provide a computer-implemented method for automatic image processing that restores a raw image to its "best" state as measured by an objective quality metric and simultaneously retrieves information regarding the optical properties of the medium.

As described above, the data representing a digital image can be considered as data describing the real object in the image convolved with the MTF of the imaging system. By modifying the MTF, the restored image can be altered accordingly. Thus, in the method of the present invention, the MTF creating the image is systematically modeled until a "best" image is obtained. The particular iteration of the MTF that produces that best image is then determined, and the optical properties embodied in that MTF are retrieved.

As noted above, the data of the image is the collection of photons reflecting off of the object traveling through the photographic medium until they are received at the imaging plane, e.g., a CCD or CMOS image sensor. The quality of the image as a representation of the original object is determined by the MTF of the total system, which can comprise, among other things, the MTF of the camera system ($H_{camera}(\psi,r)$) combined with the MTF of the medium ($H_{medium}(\psi,r)$. Because $H_{camera}(\psi,r)$ will not change during the imaging process, in the method of the present invention, it can be taken as a constant. Thus, in accordance with the present invention and as described in more detail below, by revising the values of a, the absorption coefficient, b, the scattering coefficient, mean scattering angle $\theta_0$, and the range of detection r, a revised $H_{medium}(\psi,r)$ can be derived, which in turn can be used to obtain a revised, and possibly improved, image. The process of revising the $H_{medium}(\psi,r)$, restoring the image using the revised $H_{medium}(\psi,r)$, and evaluating the restored image can continue until an optimized image is retrieved, and at that point, by examining the $H_{medium}(\psi,r)$ that produced that optimized image, the system can recover the values of a, b, $\theta_0$, and r for that transfer function and thus provide information regarding the optical parameters of the medium as well.

FIG. 1 presents an exemplary process flow for image restoration and optical property retrieval in accordance with the present invention. As will be appreciated by one skilled in the art, such a method for automated image restoration and retrieval of optical properties of the medium described herein can be accomplished by executing one or more sequences of computer-readable instructions read into a memory of one or more general or special-purpose computers configured to execute the instructions. In addition, one skilled in the art would readily appreciate that the form and content of the instructions that can be used to accomplish the steps described herein can take many forms, and all such instructions, irrespective of their form and/or content, are within the scope of the present disclosure.

As seen in FIG. 1, to start the image restoration process, at step 101, the computer receives data representing a raw, unprocessed digital image. At step 102, the computer evaluates the image according to an Image Quality Metric (IQM), described in more detail below, and based on the IQM, calculates an objective measure of the image quality of the raw image, for example, the raw Weighted Grayscale Average (WGSA) 103 as shown in FIG. 1, which comprises a single value representing the sharpness of the selected edges in the image, although a set of values or a matrix can also be used. At step 104, a decision engine in the computer receives and stores data of the WGSA 103, compares the value of the received WGSA 103 to previously received and stored WGSA values and in a yes/no query, determines whether the input WGSA 103 can be "improved" over the previously stored WGSA. If the answer at step 104 is "yes," the image will be further processed to see if a still better image, as measured by the IQM, can be obtained. The steps in processing the image to obtain a "better" image are accomplished in steps 105 through 107 shown in FIG. 1 and, in accordance with the present invention, turn on modeling an "improved" MTF that more accurately reflects the MTF of the system, and in particular reflects the transfer function $H_{medium}(\psi,r)$ of the medium in which the image was taken.

The process of revising the MTF is accomplished in steps 105 and 106 shown in FIG. 1. At step 105, the computer receives data of modeled values of a, the medium's absorption coefficient, and b, the medium's scattering coefficient, and at step 106, the computer uses these modeled values to derive a revised MTF for the imaging system. As noted above, the MTF for the camera, $H_{camera}(\psi,r)$, remains constant, and therefore only the MTF for the medium, $H_{medium}(\psi,r)$, is changed as the optical properties such as values of a, b, r, and $\theta_0$ are revised. As noted above, $\theta_0$ can be considered as a measure of the mean scattering angle (MSA) and varies with the shape of scattering phase function thus has limited contributions (See Hou et al., *Opt Exp.* 16, supra). In various embodiments of a method in accordance with the present invention, any one or more of the values of a, b, r, and $\theta_0$ can be revised. In an exemplary embodiment described herein variations in $\theta_0$ are ignored, but one skilled in the art would understand its contributions to the MTF. The same treatment applies to the range r, as one skilled in the art often treats it as part of the optical parameter, as optical range is defined as the product of attenuation and physical range.

At step 106, using modeled optical properties such as the values of a, b, and r set at step 105, a modeled $H_{medium}(\psi,r)$ can be derived which, combined with the unchanged $H_{camera}(\psi,r)$, can be used to derive a revised MTF for the system. Although it is readily apparent that the values of a, b, and r can be modeled and changed in any manner deemed appropriate, in an exemplary embodiment, a predetermined set of test values of a, b, and r at a given wavelength and excluding those by water itself can be used. In an alternative embodiment, a predetermined range of test values of a, b, and r can be used, with a, b, and r set to initial values and those values being iterated in a series of predetermined steps up to a predetermined maximum. Of course, many other ways of setting the test values of a, b, and r can be used, and such other ways also are within the scope of the present disclosure. Irrespective of the way in which the initial test values of a, b, and r are set or the values in which those values are iterated, in any iteration, the value of a, the value of b, the value of r, or the value of all can be changed so that there can be any combination of a, b, and r within the modeled range.

At step 107 shown in FIG. 1, in accordance with the image processing principles described above, a restored image can then be derived by using the revised MTF convolved with the original object data. As noted above, because the original object data does not change, any changes in the restored image produced at step 107 can be directly attributable to the changes in the MTF, which in turn can be directly attributable to the changes in the modeled values of a and/or b, r.

At step 108, the restored image is evaluated according to the same IQM as used to evaluate the original raw image, and at step 109, a revised WGSA value is calculated to provide an objective measure of the quality of the restored image. This revised WGSA value is then input into the computer's decision engine and stored in memory, and in a new instance of step 104 is evaluated to determine whether the revised WGSA value can be "improved" over any of the previously stored values. As noted above, in some embodiments in accordance with the present invention, this decision process can be accomplished by an exhaustive process, wherein a set of modeled MTF are calculated based on a predefined set of optical parameter values, and the WGSAs of the restored images produced by those modeled MTFs are compared to identify the "best" value. In other embodiments, the decision process can be accomplished by use of any other appropriate search optimization algorithm known in the art.

Thus, if the answer at step 104 is "yes," then steps 105 through 109 are repeated to seek further possible improvements, with the one or more of the values of a, b, and r being iterated as described above, and the revised WGSA being evaluated at step 104 to find whether there has been an improvement until the "best" value of the WGSA is found.

Alternatively, if at step 104 the answer is "no," i.e., the current WGSA value evaluated against the previous values can not be further improved over the previous values. At that point, the process stops, the optical parameter values that provided the "best" WGSA value are identified, and at step 110 an optimized image is produced using an MTF having those values.

As noted above, a key component of the computer-implemented image processing system and method of the present invention is the use of an objective image quality metric to provide a simple, easily comparable measurement of image quality. The use of an objective image quality metric permits the use of the automated restoration scheme of the present invention, since it enables the computer to "know" which direction to "go" in restoring an image in small improvement increments, and "know" when to stop.

Figure 2:
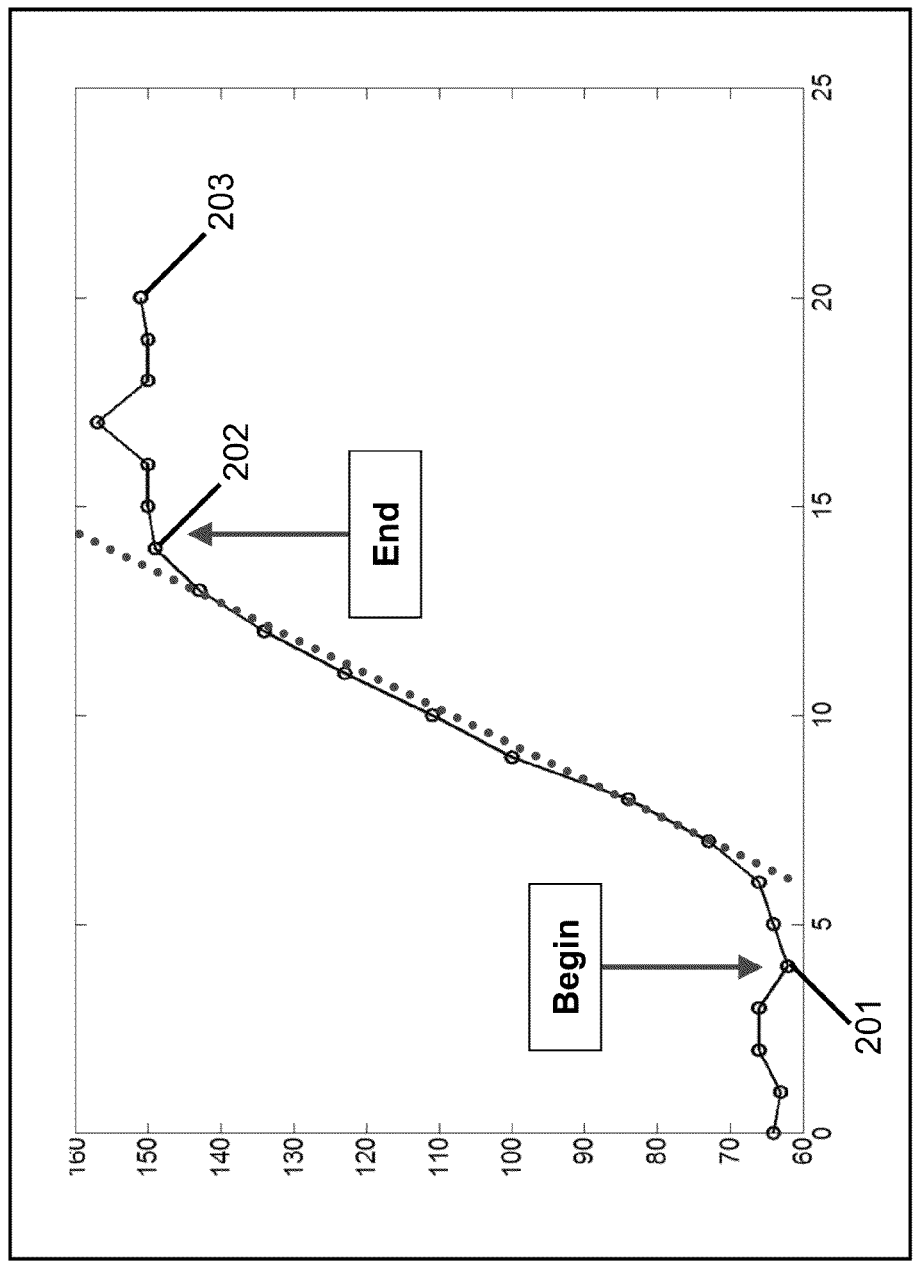
FIG. 2 depicts aspects of an exemplary method of edge location as used in the present invention.

An exemplary image quality metric for use in the present invention is now described with reference to FIGS. 2 and 3. However, it can readily be appreciated that the method of the present invention is not limited to use of any particular image quality metric, and any objective metric of image quality that provides a readily comparable output can be used so long as it adequately reflects the characteristics of underwater imagery, and use of such other metrics is contemplated within the scope of the present disclosure.

To properly define the sharpness of an image, it is critical to correctly determine the edge profile. A typical edge profile from an underwater image can be seen in FIG. 2, which is taken from an actual underwater image frame. To minimize the scattering-induced photon noise in the digital image, using software, the image is denoised by the computer, for example, by applying Daubechies wavelets, to obtain more consistent result at locating the edges of the image. The edge pixels can then be determined by the computer by identifying the continuous ascent (or descent) of pixels in one direction from the pre-denoised image. Thus, as seen in FIG. 2, the edge is estimated to begin at point 201, where line 203 begins its upward slope, and is estimated to end at point 202, where the slope of line 203 ceases its upward direction. The grayscale value of the pixels has a step size in grayscale (SSG) no less than a pre-determined value, to discriminate against unaccounted random fluctuations. This pre-determined value contains information related to the medium scattering characteristics in order to find the correct edge widths and can be calculated based on the image noise variances using an adaptive Wiener filter approach, see J. S. Lim, *Two-Dimensional Signal and Image Processing* (Prentice Hall, Englewood Cliffs, N.J., 1990), or otherwise. The resulting edge profile is essentially a denoised edge spread function (ESF), and is directly related to the MTF of the medium.

Figure 3:
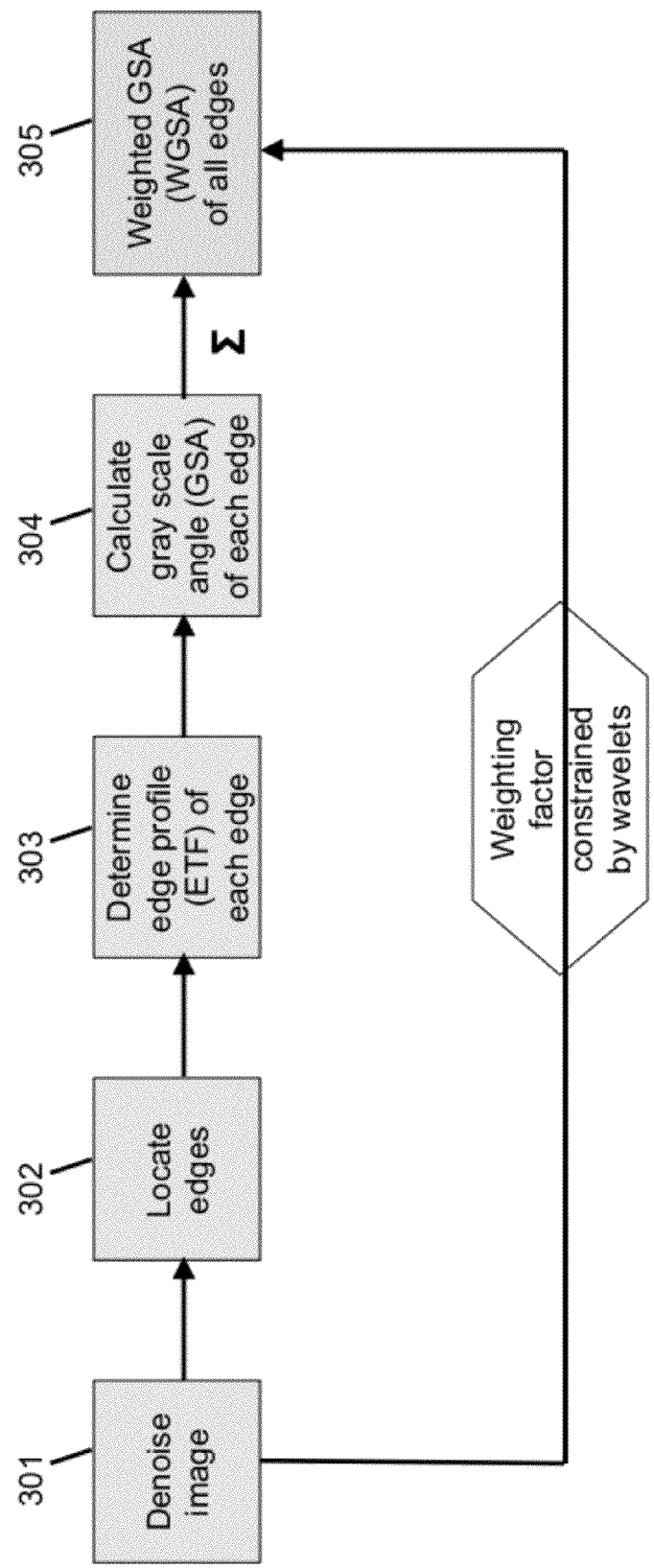
FIG. 3 is a block diagram depicting an exemplary process flow for determining an objective image quality metric (IQM) in accordance with the present invention.

Steps in an exemplary method for determining an image quality metric in accordance with the present invention are shown in FIG. 3. As a first step in the process, at step 301, the image is denoised. Due to the strong scattering of the medium, some photons can be scattered into rather large angles away from the straight path, resulting in low photon count at the ends of the edge. These photons often are classified as "noise," but are in fact the extension or part of the "broadening" of the edge caused by the scattering, therefore preserving these extensions while removing true noise is critical in denoising process.

In the exemplary method for determining an image quality metric described herein, at step 301, the edges of the image can be located more precisely by applying one or more wavelet decomposition techniques, such as those employing Daubechies wavelets known in the art. The approximation from the wavelet decomposition of the original image provides a good chance to clearly locate the true edge and helps to retain the photons which are part of the scattering process while removing non-related noises. At step 302, the edge profiles of the image can then be found, for example, by using the Canny edge algorithm, which is based on differential of nearby pixels (see Barrett and Myers, *Foundations of Image Science* (2004)). However, one skilled in the art will appreciate that these methods of denoising and obtaining edge profiles are only exemplary methods and that other methods can equally be used within the scope of the present disclosure to denoise an image or to locate and/or determine an edge profile of the image for use in the automated image processing system of the present invention.

With the edges located, at step 303, the profile of each edge along the horizontal direction is determined, extending to the left and right of the edge pixel that was identified at step 302, e.g., by the Canny or similar algorithm known in the art. Considering the randomness of the image contents and its orientation, using edge profiles that have been determined only in one direction does not invalidate the effectiveness of the approach. If desired, to save computing resources, a subset of the edge lines, for example, only one out of every 10, can be analyzed, rather than analyzing all of the edges in the image. Very short edges also may be excluded analysis to avoid contaminations by in-water constituents such as rare large particles or large planktons. An image can be declared "edgeless" or not suitable when there are not enough suitable edges found in the image.

With all the pixels in the edge profile determined, at step 304, the grayscale angle (GSA) of the profile, which determines the raw sharpness of the edge is determined, for example, by using a simple linear regression. When all the edges have been analyzed, the average value of the GSA gives the overall measure of the sharpness of the image. To properly address the amount of noise (i.e. high spatial frequency components), and represent different lighting conditions in the underwater environment, a weighting factor that is associated with the power of the image as a function of details may be used. An exemplary weighting factor may be calculated by using the ratio between the first-level wavelet decomposed details to the total power of the original image, and at step 305 a weighted gray scale angle (WGSA) is calculated, which provides an objective, numeric measure of image quality as reflected in the sharpness of the edges in the image.

Thus, as described above, the WGSA value can be used in the image processing method according to the present invention as an objective metric of the image quality produced by any particular MTF embodying a particular set of optical parameters. In general, the WGSA value will correspond to the sharpness of the image, adequately reflecting the scattering nature of the medium, and thus a computerized image processing system can objectively evaluate image quality by comparing WGSA values, with a higher WGSA value being indicative of a "better" image.

EXAMPLES

The method of the present invention is now described with respect to some examples of its use.

Example 1

Test image sets were obtained using the Laser Underwater Camera Imaging Enhancer or LUCIE from Defense Research and Development Canada (DRDC), during an April-May 2006 NATO trial experiment in Panama City, Fla. In the experiment, the MTFs of the lens and the LUCIE camera system were measured. In addition, the optical properties of the water were controlled by introducing Maalox and absorption dye to affect the absorption and attenuation coefficients, particle size distributions, and volume scattering functions.

Figure 4B:
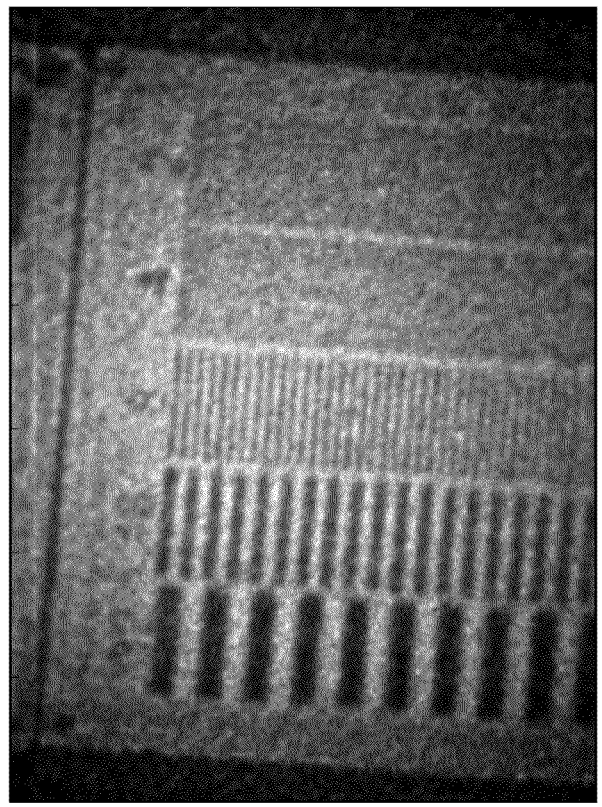
FIGS. 4A and 4B depict exemplary raw and restored images in accordance with the present invention.
Figure 4A:
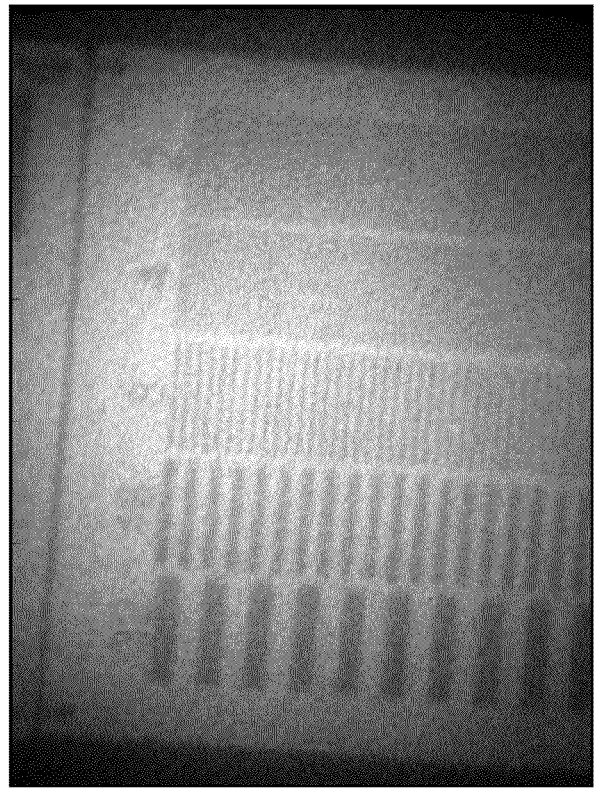

In accordance with the present invention, using the information of the camera system MTFs and the optical properties of the water, the combined system MTF, i.e., $H_{system}(u,v)$ described in Equation (6) was modeled. The test images were then restored using an automated image restoration method in accordance with the present invention, the restored images were evaluated according to the image quality metric described above, and a weighted grayscale angle (WGSA) of the original and restored images was calculated. FIGS. 4A and 4B show a sample pair of original and restored images. The image in FIG. 4A has a corresponding WGSA value of 0.05, while the image in FIG. 4B has a WGSA value of 0.14. It can readily be seen that the image in FIG. 4B is a "better" image, having discernibly sharper edges.

Example 2

Another example of image restoration in accordance with the present invention can be seen in FIGS. 5A-5D. FIG. 5A shows the original image that was obtained in a turbid underwater environment using commercially available Nikon Coolpix camera. The optical distance $\tau = c^*r$ was 2. As seen in FIGS. 5B and 5C, when the original image is deconvolved with the correct MTF (FIG. 5B), the resulting image is clearly superior in details than when it is deconvolved with a wrong MTF (FIG. 5C) which has the same MTF model but an incorrect optical range. In addition, when the original image is deconvolved with the correct MTF, the resulting image is markedly better than one restored (FIG. 5D) using a random MTF with a blind deconvolution algorithm which is independent of MTF chosen while able to recover both (see Foundations of Image Science, Barrett and Myers, 2004).

CONCLUSION

The present invention provides an automated underwater image restoration framework that can also provide information regarding optical properties of the medium including the range information. Modeling of the underwater scattering process via the optical transfer function is the foundation of the present invention. In addition, to facilitate the automatic restoration of degraded images obtained from a scattering environment, the present invention provides an objective image quality metric that is tuned to better respond to the environmental parameters. This metric is based on the sharpness of the image, wavelet denoised and weighted by a normalized power spectrum of its decomposed wavelet details. The medium scattering effects are thus accounted for in the metric used to evaluate the image in the restoration process. Results have shown that the metric of the present invention provides a consistent measure to both the original and restored images, and is suitable for automated restoration purposes.

The method for automated image restoration and retrieval of optical properties of the medium described herein can be accomplished by executing one or more sequences of one or more computer-readable instructions read into a memory of one or more computers from volatile or non-volatile computer-readable media capable of storing and/or transferring computer programs or computer-readable instructions for execution by one or more computers. Volatile computer readable media that can be used can include a compact disk, hard disk, floppy disk, tape, magneto-optical disk, PROM (EPROM, EEPROM, flash EPROM), DRAM, SRAM, SDRAM, or any other magnetic medium; punch card, paper tape, or any other physical medium such as a chemical or biological medium. Non-volatile media can include a memory such as a dynamic memory in a computer.

In addition, although particular embodiments, aspects, and features have been described and illustrated, it should be noted that the invention described herein is not limited to only those embodiments, aspects, and features. It should be readily appreciated that modifications may be made by persons skilled in the art. The present application contemplates any and all modifications within the spirit and scope of the underlying invention described and claimed herein, and such embodiments are also contemplated to be within the scope and spirit of the present disclosure.

What is claimed is:

1. A computer-implemented method for automatically retrieving information regarding optical properties of a scattering medium, comprising:
   receiving data of a first digital image, the data including data of a first value of at least one optical parameter associated with a first optical transfer function associated with the first digital image;
   receiving data of a first image quality value associated with the first digital image;
   receiving data of a second digital image, the data including data of a second value of the at least one optical parameter associated with a second optical transfer function associated with the second digital image;
   receiving data of a second image quality value associated with the second digital image;
   identifying one of the first and second digital images as an optimized digital image based on the first and second image quality values;
   transforming data of the optimized digital image into data of an associated optimized optical transfer function; and
   transforming data of the optimized optical transfer function into data of an optimized value of the at least one optical parameter, the optimized value being indicative of an optical property of the scattering medium associated with the optical parameter,
   wherein the first and second image quality values are associated with sharpness of at least one edge of the first and second digital images.

2. The method for automatically retrieving information regarding optical properties of a scattering medium according to claim 1, wherein the at least one optical parameter includes at least one of an absorption coefficient associated with an extent of absorption in the scattering medium, a scattering coefficient associated with a likelihood of scattering in the scattering medium, a scattering coefficient associated with a mean scattering angle of scattered photons in the scattering medium, and a parameter associated with the range of the object to the detection device.

3. The method for automatically retrieving information regarding optical properties of a scattering medium according to claim 1, wherein the scattering medium comprises seawater.

4. The method for automatically retrieving information regarding optical properties of a scattering medium according to claim 1, wherein the scattering medium comprises fog.

5. The method for automatically retrieving information regarding optical properties of a scattering medium according to claim 1, wherein the scattering medium comprises smoke.

6. The method for automatically retrieving information regarding optical properties of a scattering medium according to claim 1, wherein the scattering medium comprises a biological medium.

7. The method for automatically retrieving information regarding optical properties of a scattering medium according to claim 6, wherein the biological medium includes at least one of living tissue, dead tissue, blood, and bone.

8. A computer-implemented method for automatically retrieving information regarding optical properties of a scattering medium, comprising:
   receiving data of a first digital image, the data including data of a first value of at least one optical parameter associated with a first optical transfer function associated with the first digital image;
   computing a first image quality value associated with the first digital image;
   receiving data of a second digital image, the data including data of a second value of the at least one optical parameter associated with a second optical transfer function associated with the second digital image;
   computing a second image quality value associated with the second digital image;
   identifying one of the first and second digital images as an optimized digital image based on the first and second image quality values;
   transforming data of the optimized digital image into data of an associated optimized optical transfer function; and
   transforming data of the optimized optical transfer function into data of an optimized value of the at least one optical parameter, the optimized value being indicative of an optical property of the scattering medium associated with the optical parameter,
   wherein the first and second image quality values comprise weighted averages of grayscale angles computed according to the steps of:
   denoising a plurality of pixels of the first and second digital images to obtain first and second denoised digital images;
   identifying first and second pluralities of edges in the first and second denoised digital images;
   determining first and second edge profiles of each of the identified edges;
   determining first and second grayscale angles for each identified edge based on the edge profiles associated with the first and second pluralities of edges; and
   denoising and quantifying the first and second images by using Daubechies wavelets.

9. The computer-implemented method for automatically retrieving information regarding optical properties of a scattering medium according to claim 8 further comprising the step of:
   denoising the first and second digital images by decomposing the digital images using wavelet decomposition to create first and second decomposed and denoised images.

10. The computer-implemented method for automatically retrieving information regarding optical properties of a scattering medium according to claim 9 further comprising the step of:
    computing the first and second weighted grayscale angles using a normalized power spectrum associated with the wavelet decomposition.

11. The computer-implemented method for automatically retrieving information regarding optical properties of a scattering medium according to claim 8 further comprising the step of:
    locating the first and second edges in the image based on first and second approximations of the first and second decomposed and denoised images.

12. The method for automatically retrieving information regarding optical properties of a scattering medium according to claim 8, wherein the at least one optical parameter includes at least one of an absorption coefficient associated with an extent of absorption in the scattering medium, a scattering coefficient associated with a likelihood of scattering in the scattering medium, a scattering coefficient associated with a mean scattering angle of scattered photons in the scattering medium, and a parameter associated with the range of the object to the detection device.

13. The method for automatically retrieving information regarding optical properties of a scattering medium according to claim 8, wherein the scattering medium comprises seawater.

14. The method for automatically retrieving information regarding optical properties of a scattering medium according to claim 8, wherein the scattering medium comprises fog.

15. The method for automatically retrieving information regarding optical properties of a scattering medium according to claim 8, wherein the scattering medium comprises smoke.

16. The method for automatically retrieving information regarding optical properties of a scattering medium according to claim 8, wherein the scattering medium comprises a biological medium.

17. The method for automatically retrieving information regarding optical properties of a scattering medium according to claim 16, wherein the biological medium includes at least one of living tissue, dead tissue, blood, and bone.

* * * * *